US008693216B2

(12) United States Patent
Moon et al.

(10) Patent No.: US 8,693,216 B2
(45) Date of Patent: Apr. 8, 2014

(54) SWITCH CONTROL DEVICE, POWER SUPPLY DEVICE INCLUDING THE SAME, AND SWITCH CONTROL METHOD

(75) Inventors: Sang Cheol Moon, Bucheon (KR); Hyun-Chul Eom, Seoul (KR); Kwang-Il Lee, Bucheon (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 306 days.

(21) Appl. No.: 13/027,760

(22) Filed: Feb. 15, 2011

(65) Prior Publication Data

US 2011/0204866 A1    Aug. 25, 2011

(30) Foreign Application Priority Data

Feb. 19, 2010  (KR) ........................ 10-2010-0015421

(51) Int. Cl.
  *H02M 3/335*    (2006.01)
  *H02M 1/00*    (2007.01)
(52) U.S. Cl.
  USPC ........... 363/21.09; 363/49; 323/901; 323/908
(58) Field of Classification Search
  USPC ................................. 323/282–285, 901, 908;
    363/21.12–21.17, 49, 21.09; 361/93.9
  See application file for complete search history.

(56) References Cited

U.S. PATENT DOCUMENTS

| | | | |
|---|---|---|---|
| 4,621,313 A | 11/1986 | Kiteley | |
| 4,625,271 A | 11/1986 | Chetty et al. | |
| 5,949,665 A | 9/1999 | Seong | |
| 6,515,880 B1 | 2/2003 | Evans et al. | |
| 7,339,359 B2 * | 3/2008 | Choi et al. | ..................... 323/284 |
| 7,919,952 B1 * | 4/2011 | Fahrenbruch | ................. 323/222 |
| 8,064,230 B2 * | 11/2011 | Gong et al. | ................ 363/21.09 |
| 2009/0310390 A1 * | 12/2009 | Ohshima et al. | ................ 363/71 |
| 2010/0008110 A1 * | 1/2010 | Huang et al. | ............... 363/21.18 |
| 2010/0060248 A1 * | 3/2010 | Kao et al. | ....................... 323/280 |
| 2010/0157629 A1 * | 6/2010 | Yoshikawa | ................. 363/21.01 |
| 2010/0302813 A1 * | 12/2010 | Lu et al. | ..................... 363/21.01 |

* cited by examiner

*Primary Examiner* — Gary L Laxton
*Assistant Examiner* — Henry Lee, III
(74) *Attorney, Agent, or Firm* — Okamoto & Benedicto LLP

(57) ABSTRACT

The present invention relates to a switch control device, a power supply device, and a switch control method. A switch control device controls a switching operation of a power switch by using a feedback voltage of an output voltage. In detail, the switch control device generates the feedback current according to the feedback voltage and the feedback signal corresponding to the feedback voltage by using the feedback current. The switch control device compares the sensing signal corresponding to the drain current flowing to the power switch and the feedback signal, and turns off the power switch according to the comparison result. The switch control device increases the feedback gain rather than the feedback current during the gain compensation period after a predetermined gain compensation period, and the gain compensation period is longer than a soft start period in which the output voltage is gradually increased.

20 Claims, 11 Drawing Sheets

FIG. 1

SWITCH CONTROL DEVICE, POWER SUPPLY DEVICE INCLUDING THE SAME, AND SWITCH CONTROL METHOD

CROSS-REFERENCE TO RELATED APPLICATION

This application claims priority to and the benefit of Korean Patent Application No. 10-2010-0015421 filed in the Korean Intellectual Property Office on Feb. 19, 2010, the entire contents of which are incorporated herein by reference.

BACKGROUND OF THE INVENTION (a) Field of the Invention

The present invention relates to a switch control device, a power supply device including the same, and a control method thereof. Particularly, the present invention relates to a switch control device and a control method thereof for controlling a switching operation of a power switch under a soft start mode and a standby mode of a power supply device.

(b) Description of the Related Art

The power supply device is operated according to a soft start mode for preventing an in-rush current under initial operation and minimizing an output overvoltage. The soft start mode controls the switching operation of the power switch of the power supply device to gradually increase an output voltage at the initial operation of the power supply device. That is, the switching operation of the power switch is controlled for the output voltage of the power supply device to be gradually increased during a time that the power supply device is operated according to the soft start mode.

In general, an additional soft start circuit gradually increasing a soft start signal is required for controlling the power switch according to the soft start mode. The soft start circuit includes a plurality of resistors, a plurality of switches, a logic calculation circuit, an amplifier, and a counter. This is causes an increase in the size of the switch control device. The counter counts the passage of a time, the output signal of the logic calculation circuit is increased and amplified step by step according to the count result, and the switching operation of the plurality of switches is controlled according to the amplified signal. A predetermined voltage is divided into a plurality of voltages of various levels by the plurality of resistors, and one of the plurality of voltages is output as the soft start signal through the plurality of switches.

When the above soft start circuit increases the soft start signal by using the current source and the capacitor, the capacity of the capacitor must be large such that the circuit size to form the capacitor is increased. Accordingly, the soft start circuit is also large.

On the other hand, the output voltage is stabilized after the initial operation of the power supply device, and when the load that the power supply device supplies is small, the power supply device is operated according to the standby mode.

The power supply device executes the power switch switching operation during a predetermined period according to the feedback voltage to reduce the power consumption during the standby mode, and executes the burst operation stopping the switching operation during a predetermined period.

In the power supply device during the standby mode, the power consumed to control the switching operation of the power switch is relatively increased compared with the power supplied to the load.

The above information disclosed in this Background section is only for enhancement of understanding of the background of the invention and therefore it may contain information that does not form the prior art that is already known in this country to a person of ordinary skill in the art.

SUMMARY OF THE INVENTION

A switch control device, a power supply device, and a switch control method for reducing the power consumed by the power supply device during the standby mode are provided.

Also, a switch control device and a power supply device including the same having a small size without an additional soft start circuit are provided.

A switch control device controlling a switching operation of a power switch by using a feedback voltage corresponding to an output voltage according to the present invention includes: a current generating unit generating a feedback current according to the feedback voltage; a feedback generating unit generating a feedback signal corresponding to the feedback voltage by using the feedback current; and a PWM control unit comparing a sensing signal corresponding to a drain current flowing to the power switch and the feedback signal and turning off the power switch according to the comparison result. The current generating unit increases the feedback gain rather than the feedback current of the gain compensation period after a predetermined gain compensation period, and the gain compensation period is longer than a soft start period in which the output voltage is gradually increased.

The current generating unit may generate a peak current to generate a current limit signal determining the current limit of the drain current, the peak current may be a value of which a peak gain is multiplied by the feedback voltage, the feedback current is a value of which a predetermined gain is multiplied by the peak current, and the peak gain may be increased after the passage of the gain compensation period. If the power source voltage supplied to the switch control device is more than a threshold voltage required for the operation of the switch control device, the switch control device may start to be operated, and the current generating unit may increase the peak gain if the gain compensation period has passed from a time that the switch control device starts to be operated.

The current generating unit may include: a first peak current source generating a first peak current of which the first gain is multiplied by the feedback voltage; a second peak current generating a second peak current of which the second gain is multiplied by the source the feedback voltage; a counter counting a gain compensation period and generating a count signal of the first level if the gain compensation period has passed; a gain transistor including a first electrode connected to the first peak current source, a second electrode connected to the second peak current source, and a gate electrode transmitted with the count signal and turned on by the count signal of a first level; a current detection unit detecting the peak current and outputting the detected peak current; and a current mirror multiplying the third gain by the detected peak current to generate the feedback current, wherein if the gain transistor is turned off the peak current may be the first peak current, and if the gain transistor is turned on the peak current may be the sum of the first peak current and the second peak current.

The current generating unit may multiply a feedback gain by the feedback voltage to generate the feedback current, and the feedback gain is increased after the gain compensation period. If the power source voltage supplied to the switch control device is greater than a threshold voltage required for the operation of the switch control device, the switch control device may start to be operated, and the current generating unit may increase the peak gain if the gain compensation period has passed from a time that the switch control device starts to be operated. The current generating unit may include: a first feedback current source generating a first feedback current of which the fourth gain is multiplied by the feedback voltage; a second feedback current source generating a second feedback current of which the fifth gain is multiplied by the feedback voltage; a counter counting a gain compensation period and generating a count signal of the first level if the gain compensation period has passed; and a gain transistor including a first electrode connected to the first feedback current source, a second electrode connected to the second feedback current source, and a gate electrode transmitted with the count signal, and turned on by the count signal of the first level, wherein if the gain transistor is turned off the feedback current may be the first feedback current, and if the gain transistor is turned on the feedback current may be the sum of the first feedback current and the second feedback current.

The feedback generating unit may include: a first resistor including one terminal applied with the feedback voltage; a second resistor including one terminal connected to the other terminal of the first resistor and the other terminal that is grounded; and a zener diode including a cathode connected to one terminal of the first resistor and an anode that is grounded, wherein the remaining current except for the current generating the feedback voltage among the feedback current may flow to the second resistor, and the voltage generated to one terminal of the second resistor may be the feedback signal.

The PWM control unit may include: a PWM comparator generating a comparison signal according to a result of comparing the feedback signal and the sensing signal: an oscillator generating a switching clock signal determining the switching frequency of the power switch; a PWM latch receiving the switching clock signal and the comparison signal reset into the first level by the switching clock signal, and outputting a duty control signal that is changed to the second level by the comparison signal; and a PWM logic calculation unit generating a gate driving signal turning off the power switch according to the switching clock signal and the duty control signal, wherein the PWM logic calculation unit may generate a gate driving signal turning off the power switch at a time that the duty control signal is changed to the second level.

The PWM comparator may compare the signal having the low value among the feedback signal and the current limit signal corresponding to the peak current with the sensing signal, and may generate the comparison signal according to the comparison result.

A power supply device converting an input power according to a switching operation of a power switch to generate an output power according to the present invention includes: a feedback circuit generating a feedback voltage corresponding to an output voltage of an output power; and a switch control device generating a feedback current according to the feedback voltage, generating a feedback signal corresponding to the feedback voltage by using the feedback current, and turning off the power switch according to a result of comparing the feedback signal and a sensing signal corresponding to a drain current flowing to the power switch. The switch control device increases the feedback gain rather than the feedback current during the gain compensation period after a predetermined gain compensation period, and the gain compensation period is longer than a soft start period in which the output voltage is gradually increased.

The switch control device may generate the feedback current by multiplying the feedback gain by the feedback voltage, and the feedback gain may be increased after the gain compensation period. If the power source voltage supplied to the switch control device is more than a threshold voltage required for the operation of the switch control device, the switch control device may start to be operated, and the feedback gain may be increased if the gain compensation period has passed from a time that the switch control device starts to be operated.

The switch control device may generate a peak current to generate a current limit signal determining the current limit of the drain current, the peak current may be a value of which a peak gain is multiplied by the feedback voltage, the feedback current may be a value of which a predetermined gain is multiplied by the peak current, and the peak gain may be increased after the passage of the gain compensation period. If the power source voltage supplied to the switch control device is more than a threshold voltage required for the operation of the switch control device, the switch control device may start to be operated, and the feedback gain may be increased if the gain compensation period has passed from a time that the switch control device starts to be operated.

The switch control device may further include a burst control unit burst-operating the power switch if a load connected to the power supply device is decreased such that the feedback voltage is less than a predetermined burst start voltage.

A switch control method controlling a switching operation of a power switch by using a feedback voltage corresponding to an output voltage according to the present invention includes: generating a feedback current according to a feedback voltage; generating a feedback signal corresponding to the feedback voltage by using the feedback current; and determining a turn-off of the power switch according to a result of comparing a sensing signal corresponding to the drain current flowing to the power switch and the feedback signal. The feedback gain is increased rather than the feedback current during the gain compensation period after a predetermined gain compensation period, and the gain compensation period is longer than a soft start period in which the output voltage is gradually increased.

The generating of the feedback current may include multiplying a feedback gain to the feedback voltage to generate the feedback current, and the feedback gain may be increased after the gain compensation period.

The switch control method may further include generating a peak current to generate a current limit signal determining the current limit of the drain current, wherein the peak current may be a value of which a peak gain is multiplied by the feedback voltage, the feedback current may be a value of which a predetermined gain is multiplied by the peak current, and the peak gain may be increased after the passage of the gain compensation period.

According to the present invention, a switch control device, a power supply device including the same, and a switch control method thereof capable of decreasing power consumed in the power supply device during a standby mode are provided.

Also, an additional soft start circuit is not included such that the switch control device is decreased in size, and the power supply device including the same is provided.

DETAILED DESCRIPTION OF THE EMBODIMENTS

Figure 1:
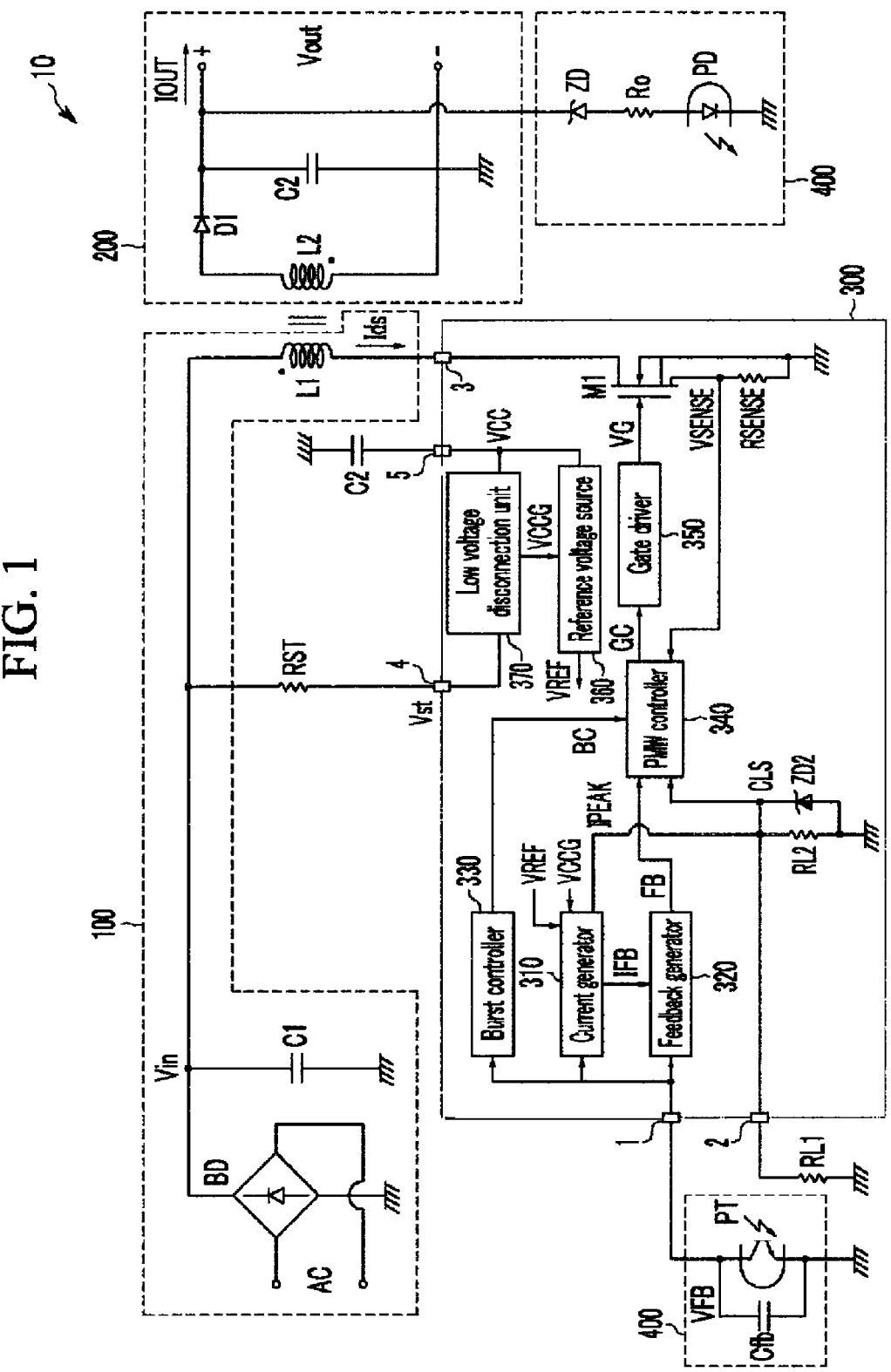
FIG. 1 is a power supply device including a switch control device according to the first exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

In the following detailed description, only certain exemplary embodiments of the present invention have been shown and described, simply by way of illustration.

FIG. 1 is a view of a power supply device including a switch control device according to the first exemplary embodiment of the present invention.

As shown in FIG. 1, a power supply device 10 includes a power supply unit 100, an output unit 200, a switching control device 300, and a feedback circuit 400.

The power supply unit 100 includes a bridge rectifier BD rectifying an AC input AC, a capacitor C1 smoothing the rectified voltage, and a primary coil L1 of a transformer connected to one terminal of the bridge rectifier BD. The power supply unit 100 receives an input voltage Vin to supply power to a secondary side of the transformer, that is, the output unit 200, according to a duty of the power switch M1.

In FIG. 1, as the power supply device, a switch mode power supply is shown, however an application of the switch control device according to an exemplary embodiment of the present invention is not limited thereto.

Also, in FIG. 1, the switch control device 300 includes the power switch M1, however the power switch M1 may be formed outside the switch control device 300.

The output unit 200 includes a secondary coil L2 of the transformer, a diode D1, and a capacitor C2.

One terminal of the secondary coil L2 of the transformer is connected to the anode of the diode D1, and the cathode of the diode D1 is connected to the output terminal (+). One terminal of the capacitor C2 is connected to the output terminal (+), and the other terminal thereof is connected to the output terminal (−). The voltage between two output terminals (+, −) is the output voltage Vout of the power supply device. Also, the current supplied to a load (not shown) through the output terminal (+) is the output current IOUT.

The primary coil L1 stores the power by the drain current Ids flowing to the primary coil L1 and the power switch M1 during a period in which the power switch M1 is turned on. If the power switch M1 is turned off, the power stored in the primary coil L1 is transmitted to the secondary coil L2. The current flowing to the secondary coil L2 according to the power transmitted to the secondary coil L2 is rectified through the diode D1 and supplied to the load connected to the power supply device 10.

The current supplied from the power supply device 10 to the load is changed according to the load, and as the current supplied to the load is increased, the output voltage Vout is decreased, while as the current supplied to the load is decreased, the output voltage Vout is increased. The power supply device 10 must control the output voltage Vout to be uniform, and controls the switching operation of the power switch M1 for this. To control the switching operation of the power switch M1, the information for the output voltage Vout must be transmitted to the switch control device 300.

The feedback circuit 400 generates the feedback voltage VFB corresponding to the output voltage Vout and transmits it to the switch control device 300.

The feedback circuit 400 includes a resistor Ro, a zener diode ZD, a opto-diode PD, a capacitor Cfb, and a opto-transistor PT. The resistor Ro, the zener diode ZD, and the opto-diode PD are coupled in series between the output terminal (+) and a predetermined power source, for example a ground terminal. The opto-transistor PT is connected to the feedback terminal FB of the switch control device 300 and the predetermined power source, for example the ground terminal, and an opto-coupler is formed along with the opto-diode PD.

If the current flows through the opto-diode PD according to the output voltage Vout such that the opto-diode PD emits light, the light from the opto-diode PD is transmitted to a base of the opto-transistor PT and the current corresponding thereto flows from a collector of the opto-transistor PT to an emitter. The feedback current ("IFB" in FIG. 2) supplied to the feedback terminal FB from the current generating unit 320 of the switch control device 300 is supplied to the capacitor Cfb, and thereby the feedback voltage VFB is charged to the capacitor Cfb. If the current flowing to the opto-transistor PT is increased, the current is discharged from the capacitor Cfb such that the feedback voltage VFB is decreased, and if the current flowing to the opto-transistor PT is decreased, the current is charged to the capacitor Cfb such that the feedback voltage VFB is increased.

Accordingly, if the output voltage Vout is increased, the feedback voltage VFB charged to the capacitor Cfb is decreased, and if the output voltage Vout is decreased, the feedback voltage VFB charged to the capacitor Cfb is increased. Here, another circuit as well as the opto-coupler may be used as the feedback circuit.

The switch control device 300 includes a power switch M1, a sensing resistor Rsense, a current generating unit 310, a feedback generating unit 320, a burst control unit 330, a PWM control unit 340, a gate driver 350, a reference voltage source 360, and a low voltage disconnection unit 370.

The switch control device 300 controls the magnitude of the feedback current IFB according to the feedback voltage VFB transmitted from the feedback circuit 400. Also, the switch control device 300 according to the first exemplary embodiment also controls a peak current IPEAK controlling a maximum current value of the drain current Ids flowing to the power switch M1 according to the feedback voltage VFB. This will be described with reference to FIG. 2.

The switch control device 300 uses an input voltage Vin to receive the power source voltage VCC required for the operation, however the present invention is not limited thereto.

The connection terminal 4 of the switch control device 300 is connected to one terminal of the resistor RST, and the other terminal of the resistor RST is transmitted with the input voltage Vin. The connection terminal 5 of the switch control device 300 is connected to one terminal of the capacitor C2, and the other terminal of the capacitor C2 is grounded.

The switch control device 300 charges the capacitor C2 by using the voltage Vst input through the connection terminal 4 to generate the power source voltage VCC.

The power switch M1 has the gate electrode, the drain electrode, and the source electrode as a control electrode and two electrodes. The drain electrode of the power switch M1 is connected to the other terminal of the primary coil L1 of the transformer through the connection terminal 3, and the source electrode of the switch M1 is connected to the sensing resistor Rsense. In FIG. 1, the power switch M1 is realized by an N-channel metal oxide semiconductor field effect transistor ("MOSFET"), however the power switch M1 may be realized by another channel or another type of transistor.

The sensing resistor Rsense is connected between the source of the switch M1 and the ground terminal, and when the switch M1 is turned on, the drain current Ids flowing from the drain to the source of the switch M1 is sensed. The sensing signal VSENSE is determined corresponding to the drain current Ids, and is input to the PWM control unit 330.

The switch control device 300 receives the feedback voltage VFB through the feedback terminal 1. The switch control device 300 generates the peak current IPEAK and the feedback current IFB corresponding to the feedback voltage VFB, the feedback signal FB corresponding to the feedback voltage VFB by using the feedback current IFB, and the current limit signal CLS by using the peak current IPEAK.

The peak current IPEAK is supplied to the resistor RL1 connected between the current limit terminal 2 of the switch control device 300 and the ground terminal and the resistor RL2 connected in parallel to the resistor RL1 to generate the current limit signal CLS. The current limit signal CLS is determined according to the current flowing to the resistor RL1 and the resistor RL2, and the current flowing to the resistor RL2 among the peak current IPEAK is determined according to the resistance ratio of the resistor RL1 and the resistor RL2. Accordingly, the current limit signal CLS is determined according to the resistor RL1, the resistor RL2, and the peak current IPEAK. The current limit signal CLS determines the maximum current capable of flowing to the power switch M1. Here, the maximum current is referred to as a current limit.

The zener diode ZD2 coupled in parallel to the resistor RL2 clamps the current limit signal CLS such that the current limit signal CLS is not over the predetermined zener voltage VZ2.

The current generating unit 310 generates the feedback current IFB and the peak current IPEAK that is changed according to the feedback voltage VFB transmitted through the feedback terminal 1. In detail, the current generating unit 310 according to the first exemplary embodiment of the present invention generates the peak current IPEAK, the peak gain for the feedback voltage VFB, and the feedback current IFB having the feedback gain for the feedback voltage VFB. If the feedback voltage VFB is decreased such that the peak current IPEAK and the feedback current IFB are decreased, during a period in which the power supply device is operated according to the standby mode, the power consumed in the switch control device is decreased.

Also, if the period (hereinafter, a soft start period) for controlling the power switch according to the soft start mode is finished, the current generating unit changes the feedback gain and the peak gain during the soft start period. In an exemplary embodiment of the present invention, the feedback gain and the peak gain are increased after the soft start period such that the frequency response of the switch control device 300 is improved.

The feedback generating unit 320 generates the feedback signal FB corresponding to the feedback voltage VFB by using the feedback current IFB and transmits it to the PWM control unit 340.

The burst control unit 330 compares the feedback voltage VFB with the burst start voltage VBL and the burst finish voltage VBH to control the burst operation. In detail, if the feedback voltage VFB is less than the burst start voltage VBL, the burst control signal BC is transmitted to the PWM control unit 340. Thus, the PWM control unit 340 generates the gate driving signal GC stopping the switching operation of the power switch M1 during the period in which the burst control signal BC is input.

The PWM control unit 340 compares the smaller signal among the feedback signal FB and the current limit signal CLS with the sensing signal VSENSE, and controls the switching operation of the power switch M1 according to the comparison result. The configuration and the operation of the PWM control unit 340 will be described with reference to FIG. 2.

The gate driver 350 generates and transmits a gate signal VG to the gate electrode of the power switch M1 according to the gate driving signal GC transmitted from the PWM control unit 340.

The power switch M1 is the N-channel transistor such that the gate signal VG has the high level signal turning on the power switch M1 or the low level signal turning off the power switch M1.

The low voltage disconnection unit 370 generates and outputs the predetermined current by using the voltage Vst transmitted through the connection terminal 4, and if the power source voltage VCC input through the connection terminal 5 is more than the low voltage reference voltage UVLO according to a hysteresis characteristic, it drives the switch control device 300. In detail, the current output from the low voltage disconnection unit 370 charges the capacitor C2 to generate the power source voltage VCC, and if the power source voltage VCC is more than the low voltage reference voltage UVLO according to the hysteresis characteristic, the low voltage disconnection unit 370 generates the driving start signal VCCG. The switch control device 300 starts to be operated by the driving start signal VCCG.

The reference voltage source 360 generates the reference voltage VREF by using the power source voltage VCC if the driving start signal VCCG is generated.

Figure 2:
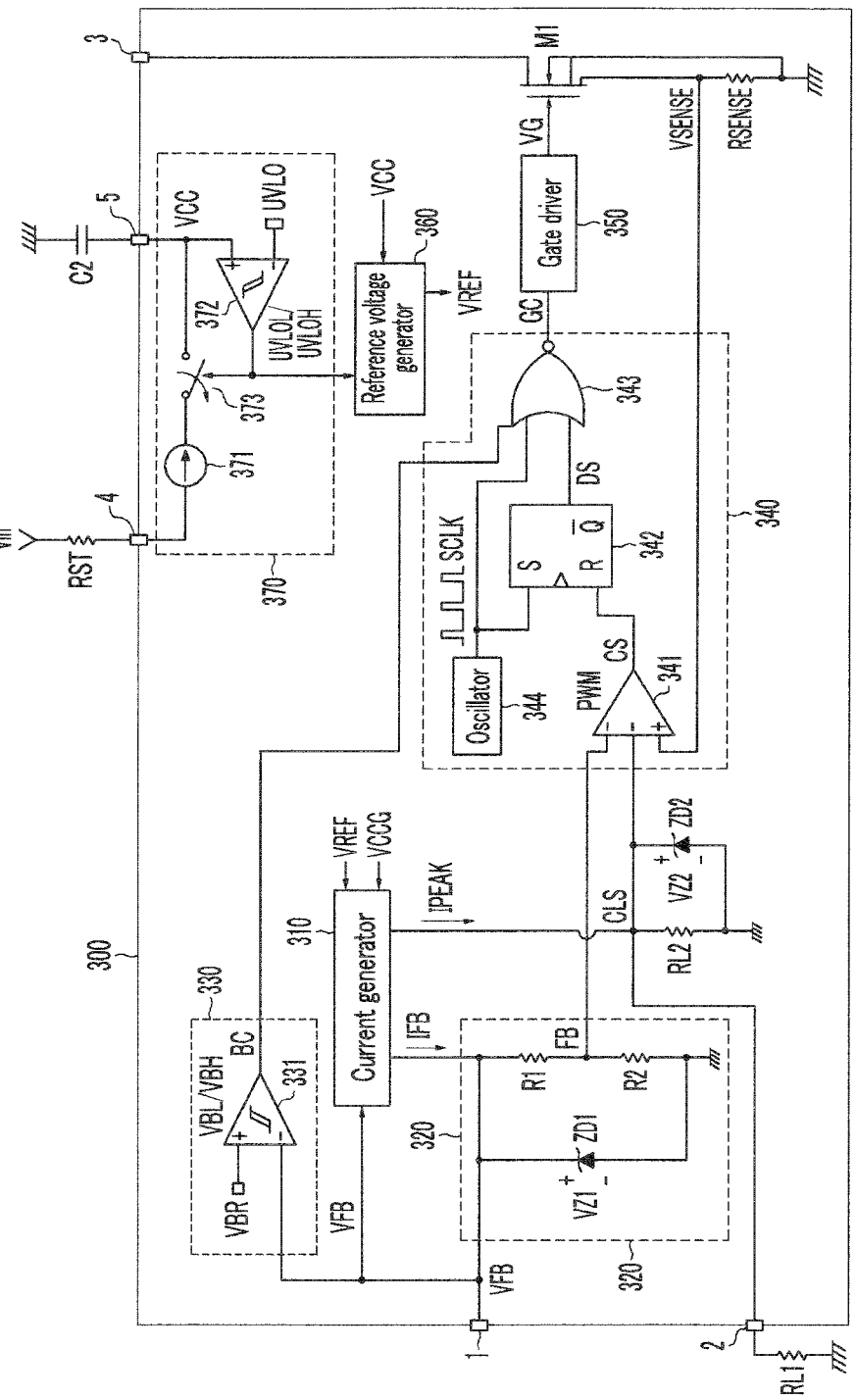
FIG. 2 is a view in detail showing a configuration of a switch control device 300 according to the first exemplary embodiment of the present invention.
Figure 3:
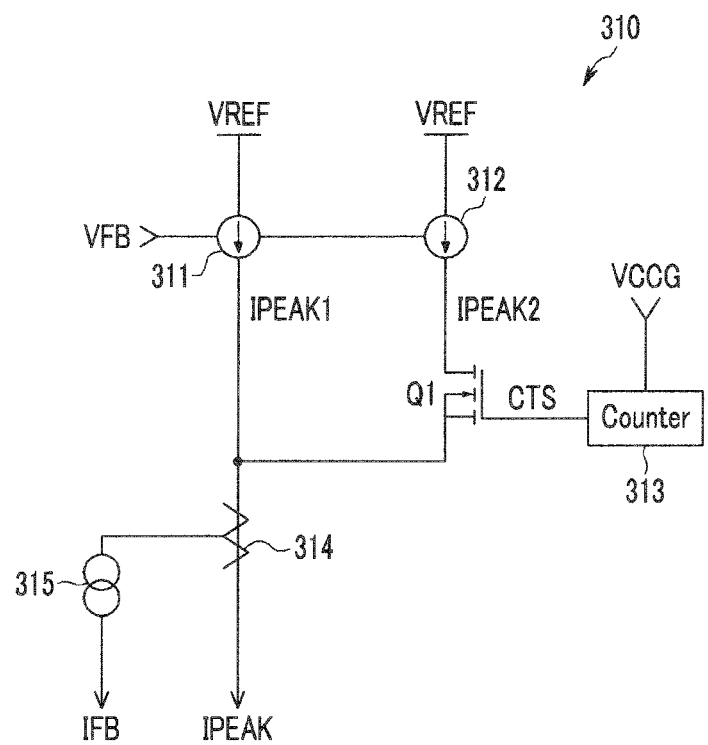
FIG. 3 is a view showing a current generating unit according to the first exemplary embodiment of the present invention.

FIG. 2 is a view showing a configuration of a switch control device 300 according to the first exemplary embodiment of the present invention in detail. FIG. 3 is a view showing a current generating unit according to the first exemplary embodiment of the present invention. The switch control device will be described with reference to FIG. 2 and FIG. 3.

As shown in FIG. 3, the current generating unit 310 includes a first peak current source 311, a second peak current source 312, a counter 313, a gain transistor Q1, a current detection unit 314, and a current mirror 315.

The first peak current source 311 generates a first peak current IPEAK1 according to the feedback voltage VFB. The first peak current source 311 according to an exemplary embodiment of the present invention is proportional to the feedback voltage VFB, and generates the first peak current IPEAK1 having the first gain for the feedback voltage VFB.

The second peak current source 312 generates a second peak current IPEAK2 according to the feedback voltage VFB. The second peak current source 312 in an exemplary embodiment of the present invention is proportional to the feedback voltage VFB, and generates the second peak current IPEAK2 having the second gain for the feedback voltage VFB.

The counter 313 turns on the gain transistor Q1 after counting a predetermined delay period (hereinafter, "a gain compensation period") from the time the driving start signal VCCG is generated. The gain compensation period GCP is the predetermined period to increase the feedback gain k*m and the peak gain k after the finish of the soft start period such that it is determined as a longer period than the soft start period. The gain transistor Q1 is the N-channel type transistor such that the counter 313 transmits the count signal CTS of the high level to the gate electrode of the gain transistor Q1 after the passage of the gain compensation period GCP.

The gain transistor Q1 has the drain electrode connected to the second peak current source 312, the gate electrode transmitting the count signal CTS, and the source electrode connected to the first peak current source 311. If the gain transistor Q1 is turned on, the peak current IPEAK is the sum of the first peak current IPEAK1 and the second peak current IPEAK2. That is, after the passage of the gain compensation period GCP, the peak current IPEAK is increased by the second peak current IPEAK2. Thus, the peak gain k is increased.

A relationship as Equation 1 is formed between the feedback voltage VFB and the peak current IPEAK.

$$IPEAK = *VFB \quad \text{(Equation 1)}$$

Here, k as the peak gain is the first peak gain during the gain compensation period GCP, and is the sum of the first peak gain and the second peak gain after the gain compensation period GCP.

The current detection unit 314 detects the peak current IPEAK to output the detected peak current IPEAK.

The current mirror 315 multiplies the detected peak current IPEAK by the third gain to generate the feedback current IFB. The current mirror 315 is the current source providing the feedback current IFB.

The relationship as in Equation 2 is formed between the feedback voltage VFB and the feedback current IFB.

$$IFB = k*m*VFB \quad \text{(Equation 2)}$$

Here, the product of the third gain m and the peak gain k becomes the feedback gain k*m.

As described above, if the feedback current IFB is generated according to the feedback voltage VFB, the feedback signal FB has the waveform in proportion to the feedback voltage VFB, and the feedback voltage VFB is gradually increased during the soft start period such that the feedback signal FB also has the waveform that is gradually increased. The time of the turn-off of the power switch M1 is determined by comparing the feedback signal FB and the sensing signal VSENSE such that the output voltage Vout is also gradually increased.

That is, the first exemplary embodiment of the present invention does not have the additional soft start circuit to generate the soft start signal that is step by step or gradually increased like the conventional switch control device. Accordingly, the size of the switch control device 300 may be decreased.

Also, the peak gain K is increased after the passage of the gain compensation period GCP, and the feedback gain k*m is also increased. The feedback current IFB is increased after the finish of the soft start period to improve the frequency response of the switch control device 300 for the load change.

If the feedback gain k*m during the soft start period is maintained after the finish of the soft start period, that is, during the normal state period, the frequency response for the load change is deteriorated. To improve this, the feedback gain k*m is increased in the normal state period. An exemplary embodiment of the present invention increases the feedback gain after the gain compensation period GCP.

The feedback generating unit 320 includes a zener diode ZD1, a resistor R1, and a resistor R2. The resistor R1 and the resistor R2 are connected in series, and the zener diode ZD1 is connected between the feedback terminal 1 and the ground.

If the zener diode ZD1 is turned on, the voltage of both terminals of the zener diode ZD1 is maintained as the predetermined zener voltage VZ1 such that the zener diode ZD1 clamps the feedback voltage VFB, thereby the feedback voltage VFB is not over the zener voltage VZ1. The zener diode ZD1 includes the cathode connected to one terminal of the resistor R1 and the anode grounded.

The resistor R1 includes one terminal applied with the feedback voltage VFB, and the resistor R2 includes one terminal connected to the other terminal of the resistor R1 and the other terminal that is grounded.

The remaining current except for the current transmitted to the feedback circuit 400 among the feedback current IFB flows to the resistor R1 and the resistor R2, and the product of that current and the resistor R2 determines the feedback signal FB. If the load is increased, the current supplied to the feedback circuit 400 is decreased and the feedback voltage VFB is increased, and thereby the feedback signal FB is also increased. If the load is decreased, the current supplied to the feedback circuit 400 is increased and the feedback voltage VFB is decreased, and thereby the feedback signal FB is also decreased. The feedback signal FB is input to the inversion terminal (−) of the PWM comparator 341.

The burst control unit 330 includes the burst comparator 331, and the burst comparator 331 compares the feedback voltage VFB input to the inversion terminal (−) and the burst reference voltage VBR input to the non-inversion terminal (+) according to the hysteresis characteristic. The burst comparator 331 is the hysteresis comparator, and the burst reference voltage VBR is divided into the burst start voltage VBL and the burst finish voltage VBH by the hysteresis characteristic. If the feedback voltage VFB becomes the voltage that is lower than the burst start voltage VBL, the burst comparator 331 generates the burst control signal BC of the high level, and if the increased feedback voltage VFB becomes the voltage that is higher than the burst finish voltage VBH, the burst control signal BC of the low level is generated. In the case that the feedback voltage VFB becomes the voltage that is less than the burst start voltage and then is the voltage that is more than the burst start voltage VBL and less than the burst finish voltage VBH (VBL<VFB<VBH), the burst comparator 331 maintains the burst control signal BC of the high level. Also, in the case that the feedback voltage VFB becomes the voltage that is more than the burst finish voltage and then is the voltage that is less than the burst finish voltage VBH and more than the burst start voltage VBL (VBL<VFB<VBH), the burst comparator 331 maintains the burst control signal BC of the low level.

The burst control unit 330 according to an exemplary embodiment of the present invention is designed to be operated after the soft start period is finished such that the output voltage is stabilized.

The low voltage disconnection unit 370 includes the source 371 generating a predetermined current by the voltage input through the connection terminal 4, the low voltage comparator 372, and the disconnection switch 373.

The current source 371 charges the capacitor C2 during the period in which the disconnection switch 373 is turned on to increase the power source voltage VCC.

The low voltage comparator 372 compares the power source voltage VCC input to the non-inversion terminal (+) and the low voltage reference voltage UVLO input to the inversion terminal (−) according to the hysteresis characteristic, and generates the driving start signal VCCG according to the compared result. The low voltage comparator 372 is also a hysteresis comparator, and the low voltage reference voltage UVLO is divided into the low voltage reference low voltage UVLOL and the low voltage reference high voltage UVLOH by the hysteresis characteristic. If the power source voltage VCC becomes the voltage that is less than the low voltage reference low voltage UVLOL, the low voltage comparator 372 generates the driving start signal VCCG of the low level, and if the power source voltage VCC becomes the voltage that is higher than the low voltage reference high voltage UVLOH, the low voltage comparator 372 generates the driving start signal VCCG of the high level. In the case that the power source voltage VCC becomes the voltage that is less than the low voltage reference low voltage UVLOL and then is the voltage that is less than the low voltage reference high voltage UVLOH and more than the low voltage reference low voltage UVLOL (UVLOL<VCC<UVLOH), the low voltage comparator 372 maintains the driving start signal VCCG of the low level. Also, in the case that the power source voltage VCC becomes the voltage that is higher than the low voltage reference high voltage UVLOH and then is the voltage that is more than the low voltage reference low voltage UVLOL and less than the low voltage reference high voltage UVLOH (UVLOL<VCC<UVLOH), the low voltage comparator 372 maintains the driving start signal VCCG of the high level.

The disconnection switch 373 is turned on by the driving start signal VCCG of the low level and turned off by the driving start signal VCCG of the high level.

The reference voltage generating unit 360 starts to be operated by the driving start signal VCCG of the high level, and generates the reference voltage VREF for the switch control device 300. In an exemplary embodiment of the present invention, the current generating unit 320 receives the reference voltage VREF, however the present invention is not limited thereto.

The PWM control unit 340 includes a PWM comparator 341, a PWM latch 342, a PWM logic calculation unit 343, and an oscillator 344.

The PWM comparator 341 includes the inversion terminal (−) input with the feedback signal FB and the current limit signal CLS and the non-inversion terminal (+) input with the sensing signal VSENSE. The PWM comparator 341 compares the low voltage among the voltage input to the inversion terminal (−) and the sensing signal VSENSE, and if the sensing signal VSENSE is more than the low voltage among the voltage input to the inversion terminal (−), it outputs the comparison signal CS of the high level, while if the sensing signal VSENSE is less than the low voltage among the voltage input to the inversion terminal (−), it outputs the comparison signal CS of the low level.

The current limit signal CLS is the voltage determined by the product of the peak current IPEAK and the resistor RL2, and the resistor RL2 is the resistor that is very large compared with the resistor R2. Accordingly, the current limit signal CLS is generally larger than the feedback signal FB. However, in the case that the load is very large such that the feedback signal FB has the very large value, the current limit signal CLS is lower than the feedback signal FB.

As described above, the drain current Ids is controlled such that the sensing signal VSENSE is not higher than the current limit signal CLS. Accordingly, the switch control device 300 according to an exemplary embodiment of the present invention may prevent an excessive current from flowing to the power switch M1 due to a large load.

The PWM latch 342 includes a set terminal S input with the switching clock signal SCLK, a reset terminal R input with the comparison signal CS, and an inversion output terminal /Q. The PWM latch 342 outputs the duty control signal DS of the low level through the inversion output terminal /Q in synchronization with the increasing edge of the switching clock signal SCLK input to the set terminal S, and the duty control signal DS becomes the high level in synchronization with the increasing edge of the comparison signal CS input to the reset terminal R. The duty control signal DS is output through the inversion output terminal /Q. The duty control signal DS determines the turn-off time of the power switch M1. The power switch M1 is turned off in synchronization with the increasing edge of the duty control signal DS. The signal resetting the duty control signal DS into the low level is the switching clock signal SCLK.

The PWM logic calculation unit 343 is realized as a NOR gate executing a NOR operation, however the present invention is not limited thereto. The PWM logic calculation unit 343 generates the gate driving signal GC of the high level when the plurality of input signals all are the low level, and generates the gate driving signal GC of the low level if one of the plurality of input signals is the high level.

The oscillator 344 generates the switching clock signal SCLK having a predetermined cycle. The switching clock signal SCLK is the signal determining the switching frequency of the power switch M1.

If the sensing signal VSENSE is increased to the lower signal among the feedback signal FB and the current limit signal CLS, the PWM comparator 341 outputs the comparison signal CS of the high level. The PWM latch 342 transmits duty control of the signal DS of the high level to the PWM logic calculation unit 343 in synchronization with the time that the comparison signal CS is increased to the high level, that is, the increasing edge. Thus, the PWM logic calculation unit 343 generates the gate driving signal GC of the low level.

Next, the PWM latch 342 generates the duty control signal DS of the low level in synchronization with the increasing edge of the switching clock signal SCLK. Next, if the switching clock signal SCLK is the low level and the burst control signal BC is the low level, the PWM logic calculation unit 343 generates the gate driving signal GC of the high level.

The gate driver GC generates the gate signal VG of the high level in response to the gate driving signal GC of the high level, and generates the gate signal VG of the low level in response to the gate driving signal GC of the low level.

As described above, the switch control device 300 according to the first exemplary embodiment generates the feedback current IFB and the peak current IPEAK that are changed according to the feedback voltage VFB to control the switching operation of the power switch M1. Also, after the soft start period is finished, the peak gain k and the feedback gain k*m are increased to increase the feedback current IFB and the peak current IPEAK. Accordingly, the frequency response is improved such that the switch control device 300 may quickly correspond to the changing load.

Also, the feedback signal FB is generated according to the feedback current IFB that is changed according to the feedback voltage VFB such that the configuration to control the power switch M1 according to the soft start mode may be decreased compared to the conventional art, and the size of the switch control device 300 may be decreased. Also, under the standby mode (i.e., when the feedback voltage VFB is small), the feedback current IFB and the peak current IPEAK are decreased such that the power consumption of the switch control device 300 may be reduced.

Figure 4:
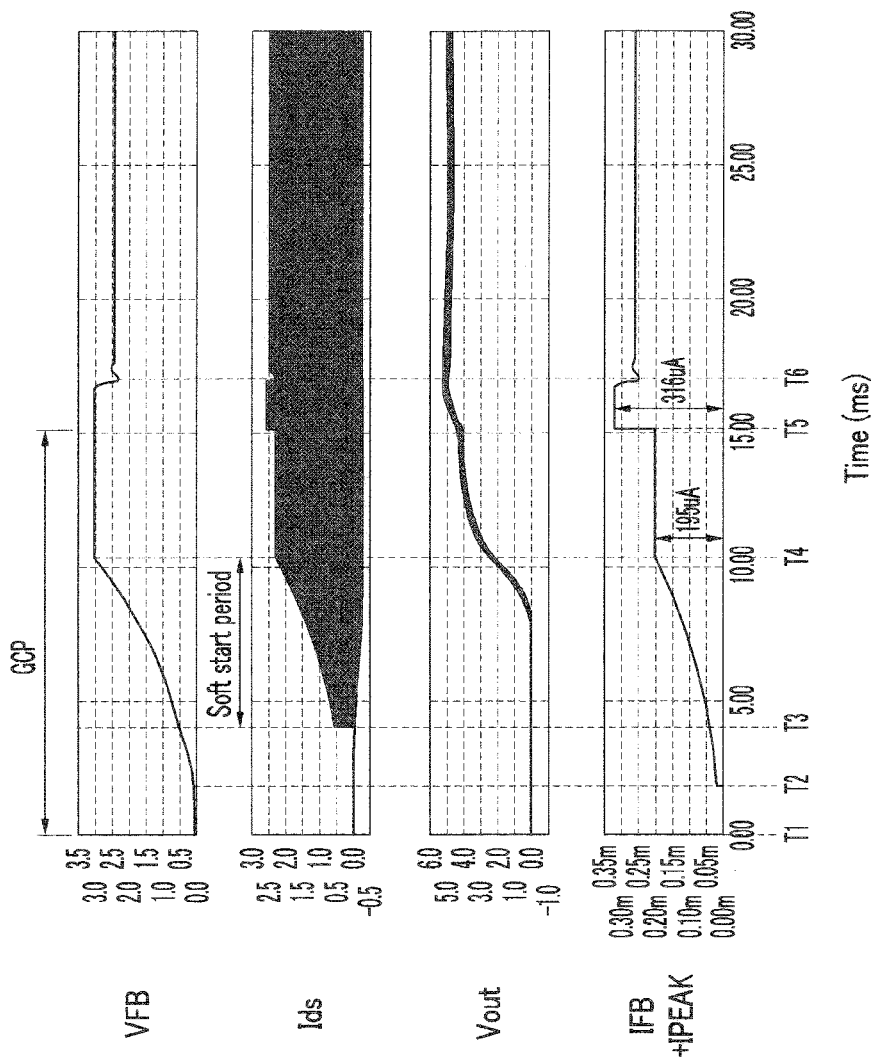
FIG. 4 is a waveform diagram showing a feedback voltage VFB, a drain current Ids, an output voltage Vout, and a sum of a feedback current IFB and a peak current IPEAK generated during a predetermined period including a soft start period in a power supply device including a switch control device according to the first exemplary embodiment of the present invention.

FIG. 4 is a waveform diagram showing a feedback voltage VFB, a drain current Ids, an output voltage Vout, and a sum of a feedback current IFB and a peak current IPEAK generated during a predetermined period including a soft start period in a power supply device including a switch control device according to the first exemplary embodiment of the present invention. The drain current Ids is swung between the peak and the minimum value according to the switching operation of the power switch M1 and the switching frequency of the power switch M1 is high such that the drain current Ids is not shown as a straight line, but as the area in the time unit shown in FIG. 4. The above description also applies to FIG. 5 to FIG. 9.

As shown in FIG. 4, the driving start signal VCCG is generated at the time T1 such that the operation of the switch control device 300 starts.

The feedback voltage VFB is generated from the time T2, and starts to increase. Thus, the feedback current IFB and the peak current IPEAK are also generated from the time T2 and start to increase.

The switching operation of the power switch M1 is started from the time T3 such that the drain current Ids is generated, and the peak of the drain current Ids starts to increase according to the feedback signal FB. The time T3 is the start time of the soft start period. The soft start period is finished at the time T4. If the feedback voltage VFB starts to be uniformly maintained after the time T4, the peak current IPEAK and the feedback current IFB are uniformly maintained. The sum of the peak current IPEAK and the feedback current IFB is 195 uA during the period T3-T4.

Also the peak gain is increased at the time T5 at which the gain compensation period (15 ms in FIG. 4) has passed by the counter from the time T1 such that the peak current IPEAK and the feedback current IFB are increased. At the time T5, the sum of the peak current IPEAK and the feedback current IFB is 316 uA.

From the time T6, if the output voltage is stabilized and the feedback voltage VFB is decreased, the peak current IPEAK and the feedback current IFB are decreased.

It is preferable that the feedback voltage VFB is gradually increased during the soft start period. In the present invention, the feedback current IFB that is gradually increased during the soft start period is used, and the switch control device gradually increasing the output voltage without the additional soft start circuit is provided.

Figure 5:
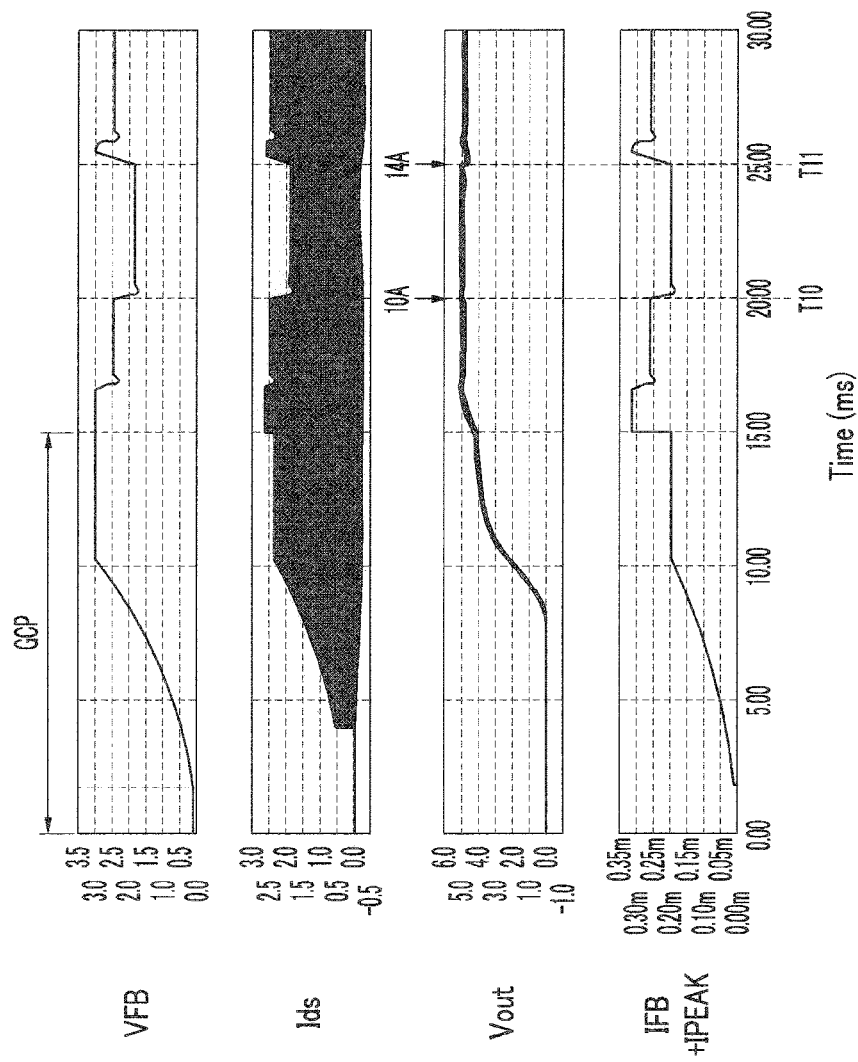
FIG. 5 is a waveform diagram of a feedback voltage VFB, a drain current Ids, an output voltage, and a sum of a feedback current IFB and a peak current IPEAK, when a load of a power supply device including a switch control device according to the first exemplary embodiment of the present invention is changed.

FIG. 5 is a waveform diagram of a feedback voltage VFB, a drain current Ids, an output voltage, and a sum of a feedback current IFB and a peak current IPEAK when a load of a power supply device including a switch control device according to the first exemplary embodiment of the present invention is changed.

Here, the load is described by using the current unit.

As shown in FIG. 5, if the load connected to the power supply device is changed from 14 A to 10 A at the time T10, the feedback voltage VFB is decreased. Thus, the feedback current IFB and the peak current IPEAK are also decreased and the peak of the drain current Ids is decreased.

Also, if the load is changed from 14 A to 10 A at the time T11, the feedback voltage VFB is increased. Thus, the feedback current IFB and the peak current IPEAK are also increased, and the peak of the drain current Ids is increased.

As shown in the waveform shown in FIG. 5, the power supply device 10 including the switch control device 300 according to the first exemplary embodiment of the present invention increases the feedback gain k*m after the gain compensation period GCP to improve the frequency response for the change of the load.

If the load is decreased at the time T10 such that the output voltage Vout is increased, the switch control device 300 is operated for the output voltage Vout of the power supply device 10 to be uniformly maintained. That is, to decrease the output voltage Vout, the power transmitted to the output terminal 200 must be decreased. For this, the output voltage Vout is increased and the feedback voltage VFB is decreased.

In the first exemplary embodiment of the present invention, the feedback current IFB is decreased according to the feedback voltage VFB, and the feedback signal input to the FBPWM control unit 340 is decreased. That is, the switch control device increases the feedback gain after the gain compensation period GCP to increase the decreasing width of the feedback signal FB according to the decrease of the load. Thus, the frequency response of the normal state is improved compared with the frequency response of the soft start period.

As shown in FIG. 5, it may be confirmed that the output voltage Vout is stabilized after the load is changed within several ms.

In FIG. 5, for the heavy load, the examples of the load for explaining the operation of the switch control device are 10A and 14A. This is only the example, and the present invention is not limited thereto.

Figure 6:
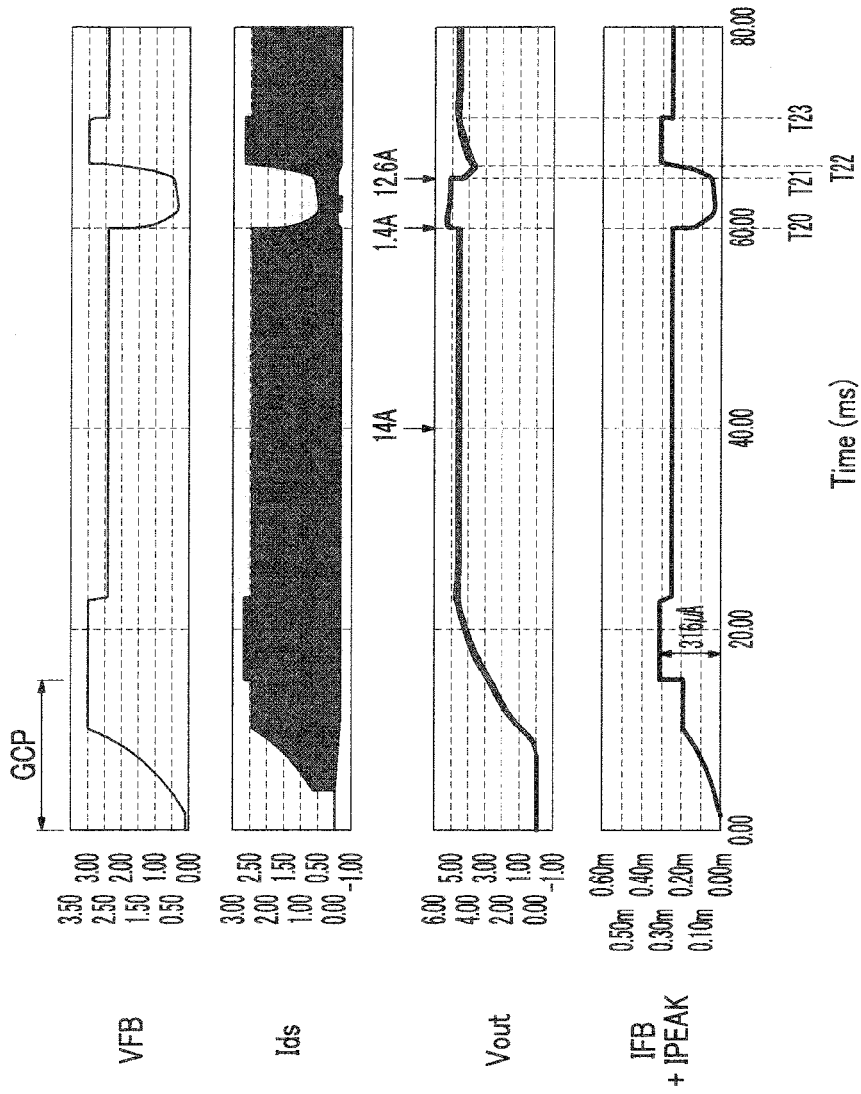
FIG. 6 is a waveform diagram of a feedback voltage VFB, a drain current Ids, an output voltage Vout, and a sum of a feedback current IFB and a peak current IPEAK, when a load of a power supply device including a switch control device according to the first exemplary embodiment of the present invention is changed.

FIG. 6 is a waveform diagram of a feedback voltage VFB, a drain current Ids, an output voltage Vout, and a sum of a feedback current IFB and a peak current IPEAK when a load of a power supply device including a switch control device according to the first exemplary embodiment of the present invention is changed. The change width of the load is larger than that of FIG. 5.

As shown in FIG. 6, at the time T20 at which the load is decreased from 14 A to 1.4 A, the feedback voltage VFB is steeply decreased. Thus, the feedback current IFB is decreased such that the feedback signal FB is decreased and the peak of the drain current Ids is decreased, and thereby the output voltage Vout is not further increased and is maintained.

At the time T21 at which the load is increased from 1.4 A to 12.6 A, the feedback voltage VFB is steeply increased. Thus, the feedback current IFB is increased such that the feedback signal FB is increased and the peak of the drain current Ids is increased, and thereby the output voltage Vout is gradually increased after the time T22 and is stabilized at the time T23.

Figure 7:
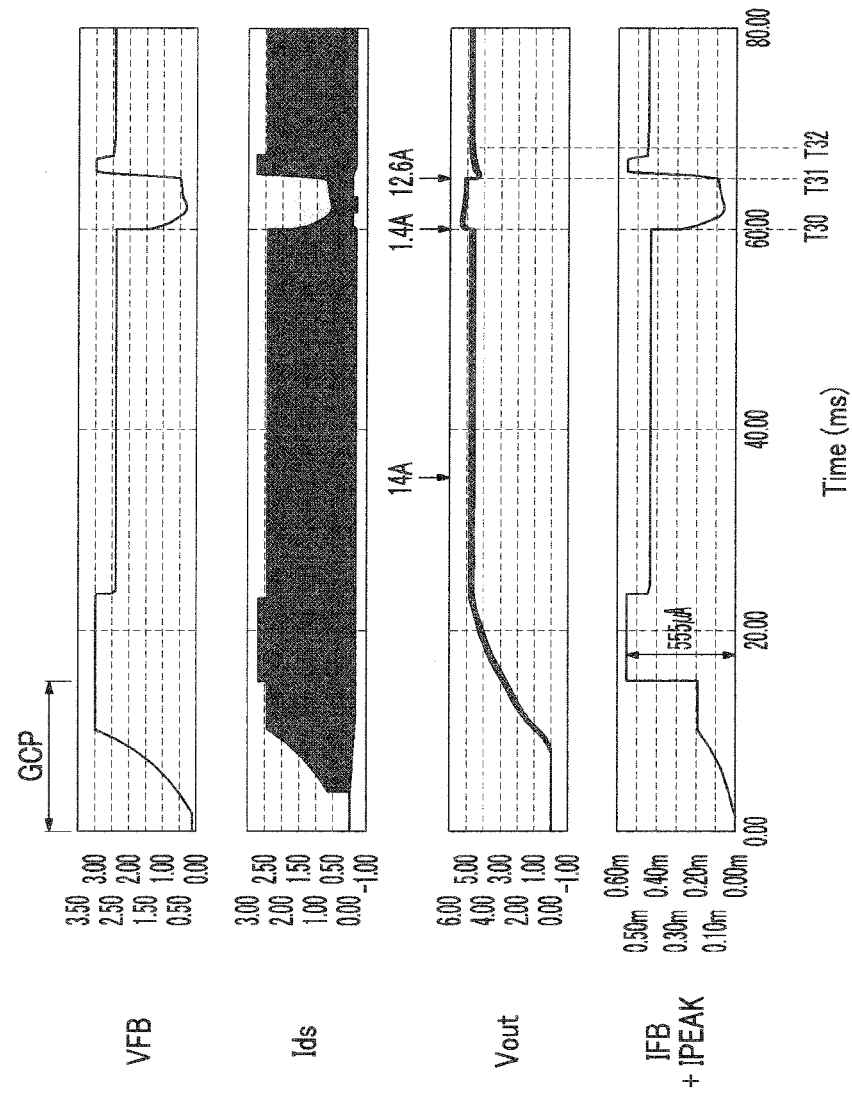
FIG. 7 is a waveform diagram showing a feedback voltage VFB, a drain current Ids, an output voltage Vout, and a sum of a feedback current IFB and a peak current IPEAK, when generating a feedback signal FB by using a larger feedback gain than a feedback gain of FIG. 6, after a gain compensation period GCP.

FIG. 7 is a waveform diagram showing a feedback voltage VFB, a drain current Ids, an output voltage Vout, and a sum of a feedback current IFB and a peak current IPEAK when generating a feedback signal FB by using a larger feedback gain than a feedback gain of FIG. 6, after a gain compensation period GCP.

As shown in FIG. 7, if the load is decreased from 14 A to 1.4 A at the time T30, the feedback voltage VFB is rapidly decreased. Thus, the feedback current IFB is decreased such that the feedback signal FB is decreased and the peak of the drain current Ids is decreased, and thereby the output voltage Vout is not further increased and is maintained.

The feedback voltage VFB is rapidly increased at the time T31 at which the load is increased from 1.4 A to 12.6 A. Thus, the feedback current IFB is increased such that the feedback signal FB is increased and the peak of the drain current Ids is increased, and thereby the output voltage Vout is increased after the time T31 and is stabilized at the time T32.

As described above, if the feedback gain is increased, the change of the output voltage Vout according to the change of the load is rapidly stabilized. That is, the frequency response is improved.

Figure 8:
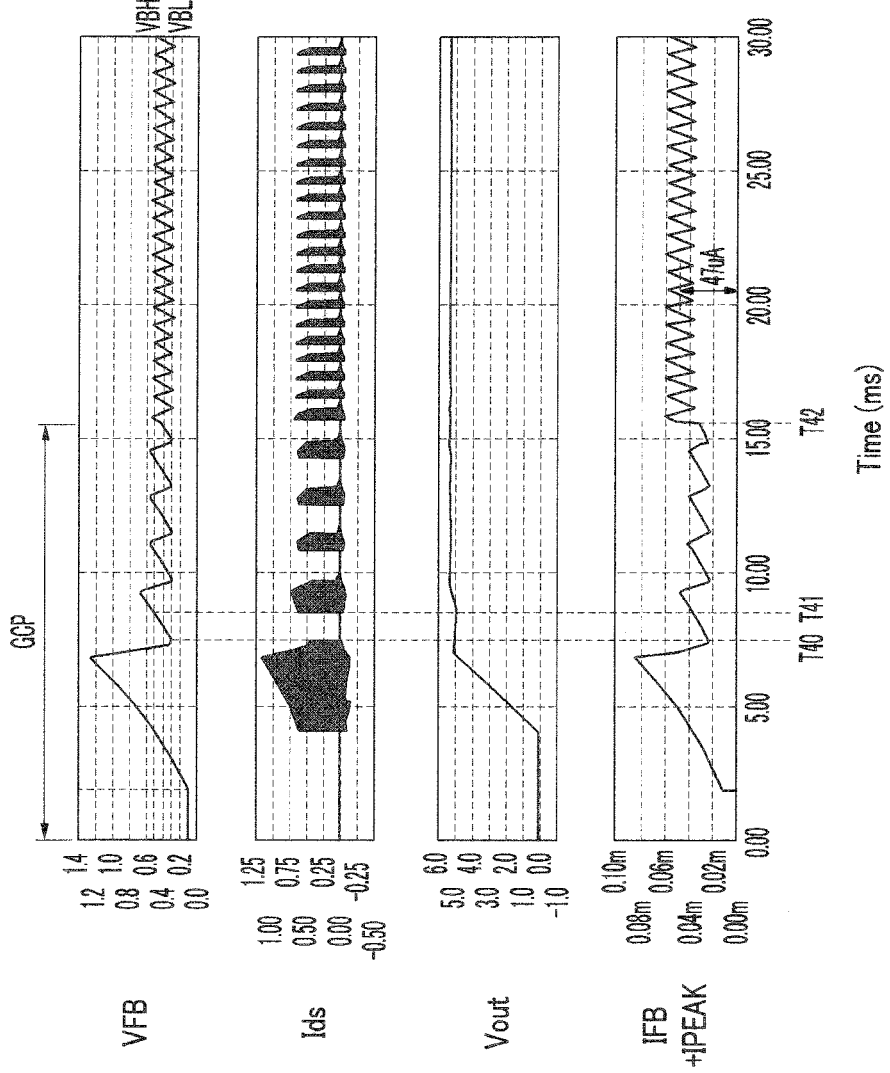
FIG. 8 is a waveform diagram showing a feedback voltage VFB, a drain current Ids, an output voltage Vout, and a sum of a feedback current IFB and a peak current IPEAK, when a power supply device including a switch control device according to the first exemplary embodiment of the present invention is burst-operated.

FIG. 8 is a waveform diagram showing a feedback voltage VFB, a drain current Ids, an output voltage Vout, and a sum of a feedback current IFB and a peak current IPEAK when a power supply device including a switch control device according to the first exemplary embodiment of the present invention is burst-operated.

Figure 9:
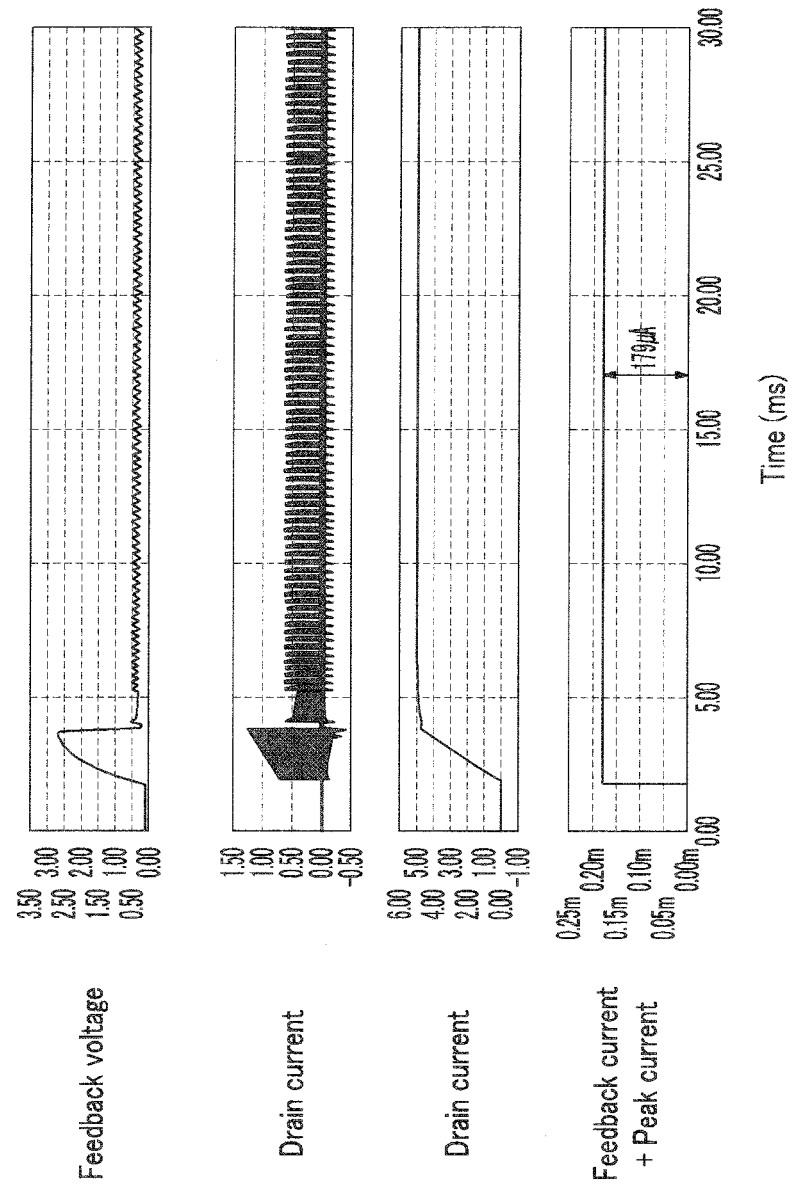
FIG. 9 is a waveform diagram showing a feedback voltage, a drain current, an output voltage, and a sum of a feedback current and a peak current, when a power supply device including a conventional switch control device is burst-operated.

FIG. 9 is a waveform diagram showing a feedback voltage, a drain current, an output voltage, and a sum of a feedback current and a peak current when a power supply device including a conventional switch control device is burst-operated. The load of FIG. 8 and FIG. 9 is 0.3 A.

As shown in FIG. 8, the load is very low such that the switch control device 300 is burst-operated from the time T40 after the soft start period is finished.

The power switch M1 is not switching-operated from the time T40 at which the feedback voltage VFB is decreased to the voltage that is less than the burst start voltage VBL among the period in which the power switch M1 is switching-operated. The power switch M1 again starts to be switching-operated at the time T41 at which the feedback voltage VFB is increased and the feedback voltage VFB is larger than the burst finish voltage VBH among the period in which the power switch M1 is not switching-operated. These operations are repeated.

The sum of the feedback current IFB and the peak current IPEAK is increased at the time T42 at which the gain compensation period GCP is finished, and the peak current IPEAK and the feedback current. IFB after the time T42 are repeatedly increased and decreased according to the change of the feedback voltage VFB. The sum of the peak current IPEAK and the feedback current IFB also includes the ripple.

The current average as the sum of the peak current IPEAK and the feedback current IFB is 47 uA less than 179 uA as the sum of the peak current IPEAK and the feedback current IFB of the conventional switch control device shown in FIG. 9.

As described above, the power consumption of the switch control device 300 according to the first exemplary embodiment of the present invention is much smaller than the power consumption of the conventional switch control device for the power supply device 10 in the standby mode.

The entire power consumption of the power supply device 10 is very large compared with the power consumption of the switch control device 300 in the state in which the standby mode is not normal such that the power consumption increase of the switch control device may be ignored. However, the entire power consumption of the power supply device 10 is very small compared with the normal state in the standby mode such that the increase of the power consumption of the switch control device 300 is a case of increasing the entire power consumption of the power supply device 10.

In the first exemplary embodiment of the present invention, the switch control device having the predetermined current limit is described. In the second exemplary embodiment of the present invention, a switch control device having a current limit that is not determined will be described.

That is, the peak current IPEAK is not generated, and a switch control device of which the feedback current IFB' is only changed and generated according to the feedback voltage VFB will be described.

Figure 10:
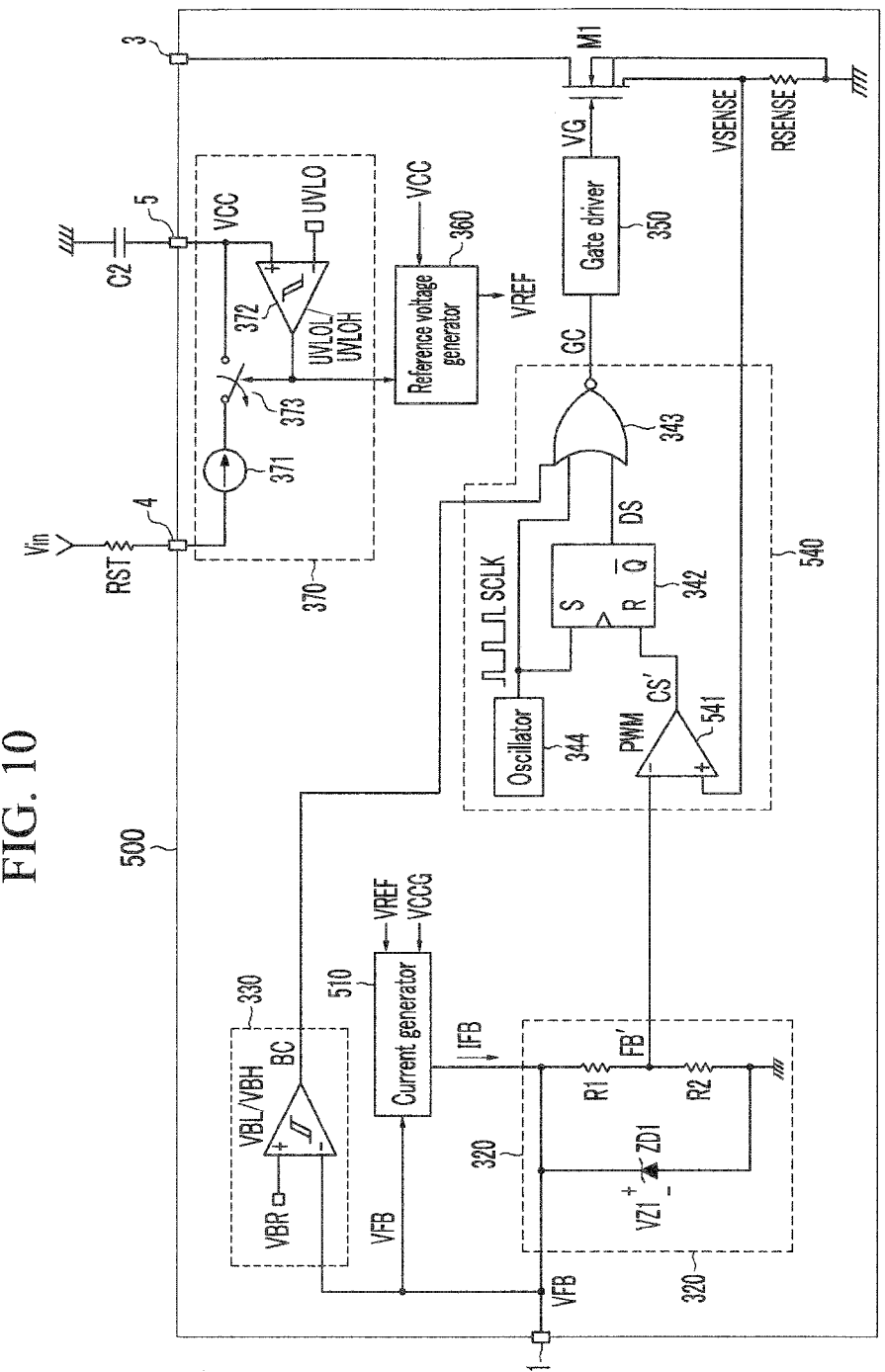
FIG. 10 is a view showing a switch control device 500 according to the second exemplary embodiment of the present invention.

FIG. 10 is a view of a switch control device 500 according to the second exemplary embodiment of the present invention. The same configurations as in the first exemplary embodiment of the present invention are indicated by the same reference numerals. In addition, overlapping description with the first exemplary embodiment is omitted in the second exemplary embodiment.

As shown in FIG. 10, in a switch control device 500 compared with the switch control device 300 according to the first exemplary embodiment of the present invention, the current generating unit 510 only generates the feedback current IFB', and the inversion terminal (−) of the PWM comparator 541 of the PWM control unit 540 is only input with the feedback signal FB. The remaining configurations and operations are the same as in the first exemplary embodiment such that the description is omitted.

The current generating unit 510 generates the feedback current IFB' that is changed according to the feedback voltage VFB and transmits it to the feedback generating unit 320. Thus, the feedback signal FB' generated from the feedback generating unit 320 is transmitted to the inversion terminal (−) of the PWM comparator 541.

The PWM comparator 541 compares the feedback signal FB' and the sensing signal VSENSE to generate a comparison signal CS' controlling the turn-off time of the power switch M1.

Figure 11:
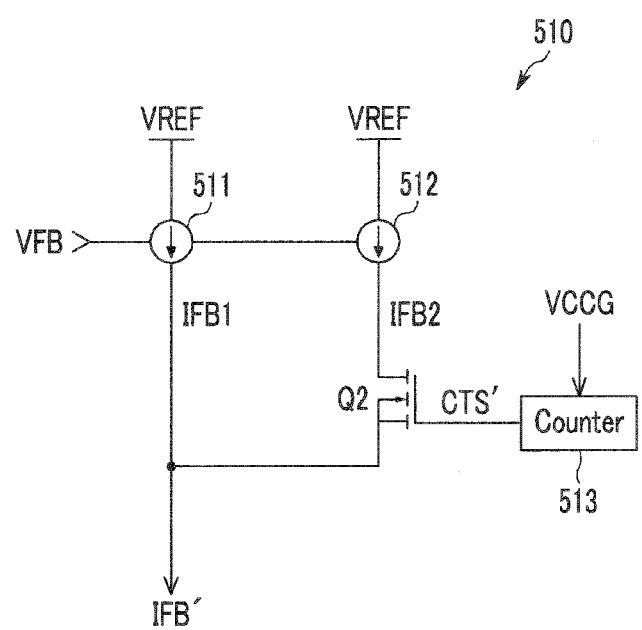
FIG. 11 is a view showing a current generating unit 510 according to the second exemplary embodiment of the present invention.

FIG. 11 is a view showing a current generating unit 510 according to the second exemplary embodiment of the present invention.

The current generating unit 510 includes a first feedback current source 511, a second feedback current source 512, a counter 513, and a gain transistor Q2.

The first feedback current source 511 generates the first feedback current IFB1 according to the feedback voltage VFB. The first feedback current source 511 according to the second exemplary embodiment of the present invention generates the first feedback current IFB1 of which the fourth gain is multiplied by the feedback voltage VFB.

The second feedback current source 512 generates the second feedback current IFB2 according to the feedback voltage VFB. The second feedback current source 512 according to the second exemplary embodiment of the present invention generates the second feedback current IFB2 of which the fifth gain is multiplied by the feedback voltage VFB.

The counter 513 turns on the gain transistor Q2 after counting the gain compensation period GCP from the time at which the driving start signal VCCG is generated. The gain transistor Q2 is the N-channel type transistor such that the counter 513 transmits the count signal CTS' of the high level to the gate electrode of the gain transistor Q2 after the passage of the gain compensation period GCP.

If the gain transistor Q2 is turned on, the feedback current IFB' becomes the sum of the first feedback current and the second feedback current. That is, after the passage of the gain compensation period GCP, the feedback current IFB' is increased by the second feedback current. Thus, the feedback gain is increased.

Equation 3 is valid between the feedback voltage VFB and the feedback current IFB'.

$$IFB'=k'*VFB \qquad \text{(Equation 3)}$$

Here, k' is the fourth gain during the gain compensation period GCP, and is the sum of the fourth gain and the fifth gain after the passage of the gain compensation period GCP. Resultantly, the fourth gain and the fifth gain may be determined for the feedback gain k' of the second exemplary embodiment to have the same value as the feedback gain k*m of the first exemplary embodiment.

The driving method and the effects thereof of the switch control device according to the first exemplary embodiment of the present invention of FIG. 4 to FIG. 8 are equally applied to the second exemplary embodiment.

That is, in the first exemplary embodiment the peak current IPEAK is the value of which the peak gain k is multiplied by the feedback voltage VFB, and the feedback current IFB is the value of which the third gain m is multiplied by the peak current IPEAK, thereby the feedback current IFB is determined as the value of which the feedback gain k*m is multiplied by the feedback voltage VFB.

In the second exemplary embodiment, the feedback current IFB' is directly determined as the value of which the feedback gain k' is multiplied by the feedback voltage VFB without the peak current IPEAK. The feedback signal FB' is determined with the multiplication of the remaining current except for the current transmitted to the feedback circuit 400 from the feedback current IFB' and the resistor R2.

The switch control device according to the first and second exemplary embodiments of the present invention may control the switching operation of the power switch M1 in the soft start mode without the additional soft start circuit. The size of the switch control device is decreased compared with the conventional art. The switch control device of the normal state may improve the frequency response for the change of the load compared with the soft start period. Also, the power consumption of the switch control device is decreased in the standby mode.

The drawings referred to hereinabove and the detailed description of the disclosed invention are presented for illustrative purposes only, and are not intended to define meanings or limit the scope of the present invention as set forth in the following claims. Those skilled in the art will understand that various modifications and equivalent other embodiments of the present invention are possible. Consequently, the true technical protective scope of the present invention must be determined based on the technical spirit of the appended claims.

<Description of Symbols> power supply device 10, power supply unit 100, output unit 200 switching control device 300 and 500, feedback circuit 400, AC input AC bridge rectifier BD, capacitor C1, primary coil L1, input voltage Vin power switch M1, secondary coil L2, diode D1, capacitor C2 resistor Ro, zener diode ZD, opto-diode PD capacitor Cfb, opto-transistor PT, sensing resistor Rsense current generating unit 310 and 510, feedback generating unit 320, burst control unit 330

PWM control unit 340 and 540, gate driver 350, reference voltage source 360 low voltage disconnection unit 370, first peak current source 311, second peak current source 312 counter 313 and 513, gain transistor Q1 and Q2, current detection unit 314 first feedback current source 511, second feedback current source 512, first feedback current IFB1 current mirror 315, zener diode ZD1, resistor R1, resistor R2 burst comparator 330, current source 371, low voltage comparator 372 disconnection switch 373, PWM comparator 341 and 541, PWM latch 342

PWM logic calculation unit 343, oscillator 344, feedback voltage VFB drain current Ids, output voltage Vout, feedback current IFB peak current IPEAK, gain compensation period (GCP), second feedback current IFB2 peak gain (k), feedback gain (k*m, k')

What is claimed is:

1. A switch control device controlling a switching operation of a power switch by using a feedback voltage corresponding to an output voltage, comprising:

a current generating unit generating a feedback current according to the feedback voltage and a feedback gain, and increasing the feedback gain to increase the feedback current in response to detecting an end of a predetermined gain compensation period that overlaps with and extends beyond a soft start period, wherein the soft start period is a period in which the output voltage is gradually increased during initial operation of the switch control device to prevent an in-rush current;

a feedback generating unit generating a feedback signal corresponding to the feedback voltage by using the feedback current; and a PWM control unit comparing a sensing signal corresponding to a drain current flowing to the power switch and the feedback signal to generate a comparison result and turning off the power switch according to the comparison result.

2. The switch control device of claim 1, wherein
the current generating unit generates a peak current to generate a current limit signal determining a current limit of the drain current, the peak current is a product of a peak gain multiplied by the feedback voltage, the feedback current is a product of a predetermined gain multiplied by the peak current, and the peak gain is increased after the end of the predetermined gain compensation period.

3. The switch control device of claim 2, wherein
if a power source voltage supplied to the switch control device is more than a threshold voltage required for the operation of the switch control device, the switch control device starts to be operated, and
the current generating unit increases the peak gain if the predetermined gain compensation period has passed from a time that the switch control device starts to be operated.

4. The switch control device of claim 3, wherein the current generating unit includes:
a first peak current source generating a first peak current that is a product of a first gain multiplied by the feedback voltage;
a second peak current generating a second peak current that is a product of a second gain multiplied by the feedback voltage;
a counter counting the predetermined gain compensation period and generating a count signal of a first level if the predetermined gain compensation period has passed;
a gain transistor including a first electrode connected to the first peak current source, a second electrode connected to the second peak current source, and a gate electrode connected to the count signal and is turned on by the count signal of the first level;
a current detection unit detecting the peak current and outputting the detected peak current; and
a current mirror multiplying a third gain by the detected peak current to generate the feedback current,
wherein if the gain transistor is turned off, the peak current is the first peak current, and if the gain transistor is turned on, the peak current is a sum of the first peak current and the second peak current.

5. The switch control device of claim 1, wherein
the current generating unit multiples the feedback gain by the feedback voltage to generate the feedback current.

6. The switch control device of claim 5, wherein,
if the power source voltage supplied to the switch control device is greater than a threshold voltage required for the operation of the switch control device, the switch control device starts to be operated, and
the current generating unit increases a peak gain if the predetermined gain compensation period has passed from a time that the switch control device starts to be operated.

7. The switch control device of claim 6, wherein
the current generating unit includes:
a first feedback current source generating a first feedback current that is a product of a fourth gain multiplied by the feedback voltage;
a second feedback current source generating a second feedback current that is a product of a fifth gain multiplied by the feedback voltage;
a counter counting the predetermined gain compensation period and generating a count signal of a first level if the predetermined gain compensation period has passed; and
a gain transistor including a first electrode connected to the first feedback current source, a second electrode connected to the second feedback current source, and a gate electrode connected to the count signal, and turned on by the count signal of the first level,
wherein, if the gain transistor is turned off, the feedback current is the first feedback current, and if the gain transistor is turned on, the feedback current is a sum of the first feedback current and the second feedback current.

8. The switch control device of claim 1, wherein the feedback generating unit includes:
a first resistor including a first terminal receiving the feedback voltage;
a second resistor including a first terminal connected to a second terminal of the first resistor and a second terminal that is grounded; and
a zener diode including a cathode connected to the first terminal of the first resistor and an anode that is grounded,
wherein a voltage generated on the first terminal of the second resistor is the feedback signal.

9. The switch control device of claim 1, wherein the PWM control unit includes:
a PWM comparator generating a comparison signal according to a result of comparing the feedback signal and the sensing signal:
an oscillator generating a switching clock signal determining the switching frequency of the power switch;
a PWM latch receiving the switching clock signal and the comparison signal, being reset into a first level by the switching clock signal, and outputting a duty control signal that is changed to a second level by the comparison signal; and
a PWM logic calculation unit generating a gate driving signal turning off the power switch according to the switching clock signal and the duty control signal,
wherein the PWM logic calculation unit generates a gate driving signal turning off the power switch at a time that the duty control signal is changed to the second level.

10. The switch control device of claim 9, wherein the current generating unit generates a peak current to generate a current limit signal determining a current limit of the drain current, the peak current is product of a peak gain multiplied by the feedback voltage, the feedback current is a product of a predetermined gain multiplied by the peak current, and the peak gain is increased after the end of the predetermined gain compensation period.

11. The switch control device of claim 10, wherein
the PWM comparator generates a second comparison result by comparing a signal having a lowest value among the feedback signal and the current limit signal corresponding to the peak current with the sensing signal, and generates the comparison signal according to the second comparison result.

12. A power supply device converting an input power according to a switching operation of a power switch to generate an output power, comprising:
a feedback circuit generating a feedback voltage corresponding to an output voltage of an output power; and
a switch control device generating a feedback current according to the feedback voltage and a feedback gain, generating a feedback signal corresponding to the feedback voltage by using the feedback current, and turning off the power switch according to a result of comparing the feedback signal and a sensing signal corresponding to a drain current flowing to the power switch, wherein the switch control device increases the feedback gain to increase the feedback current in response to detecting an end of a predetermined gain compensation period that overlaps with and extends beyond a soft start period, the predetermined gain compensation period is longer than the soft start period, and the soft start period is a period in which the output voltage is gradually increased during initial operation of the switch control device to prevent an in-rush current.

13. The power supply device of claim 12, wherein
the switch control device generates the feedback current by multiplying the feedback voltage by the feedback gain.

14. The power supply device of claim 13, wherein,
if a power source voltage supplied to the switch control device is more than a threshold voltage required for the operation of the switch control device, the switch control device starts to be operated, and the feedback gain is increased if the predetermined gain compensation period has passed from a time that the switch control device starts to be operated.

15. The power supply device of claim 12, wherein
the switch control device generates a peak current to generate a current limit signal determining a current limit of the drain current, the peak current is a product of a peak gain is multiplied by the feedback voltage, the feedback current is a product of a predetermined gain is multiplied by the peak current, and the peak gain is increased after the end of the predetermined gain compensation period.

16. The power supply device of claim 15, wherein,
if a power source voltage supplied to the switch control device is more than a threshold voltage required for the operation of the switch control device, the switch control device starts to be operated, and the feedback gain is increased if the predetermined gain compensation period has passed from a time that the switch control device starts to be operated.

17. The power supply device of claim 12, wherein the switch control device further includes a burst control unit burst-operating the power switch if a load connected to the power supply device is decreased such that the feedback voltage is less than a predetermined burst start voltage.

18. A switch control method controlling a switching operation of a power switch by using a feedback voltage corresponding to an output voltage, comprising:

generating a feedback current according to a feedback voltage and a feedback gain;

generating a feedback signal corresponding to the feedback voltage by using the feedback current; and determining a turn-off of the power switch according to a result of comparing a sensing signal corresponding to the drain current flowing to the power switch and the feedback signal, wherein the feedback gain is increased to increase the feedback current in response to detecting an end of a predetermined gain compensation period that overlaps with and extends a soft start period, and the predetermined gain compensation period is longer than a soft start period in which the output voltage is gradually increased during initial operation of the switch control device to prevent an in-rush current.

19. The switch control method of claim 18, wherein the generating of the feedback current includes multiplying the feedback voltage by the feedback gain to generate the feedback current.

20. The switch control method of claim 18, further comprising generating a peak current to generate a current limit signal determining a current limit of the drain current, wherein the peak current is a product of a peak gain multiplied by the feedback voltage, the feedback current is a product of a predetermined gain multiplied by the peak current, and the peak gain is increased after the end of the predetermined gain compensation period.

* * * * *